Feb. 1, 1927.
O. KYLIN
PRECISION TOOL OR FIXTURE
Filed Dec. 15, 1924
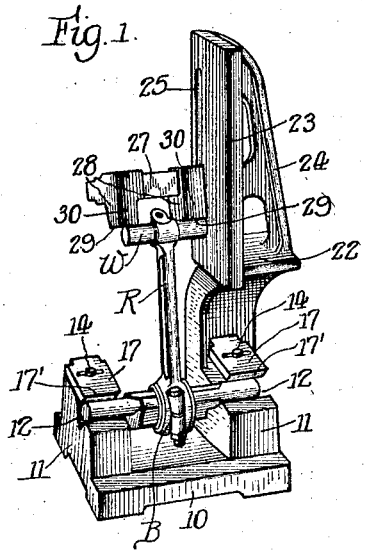
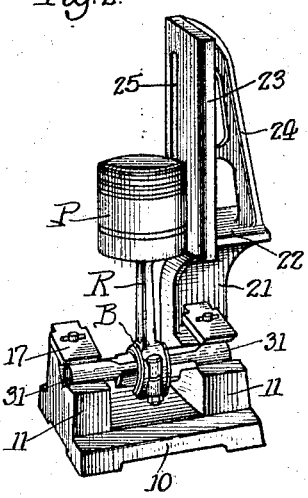
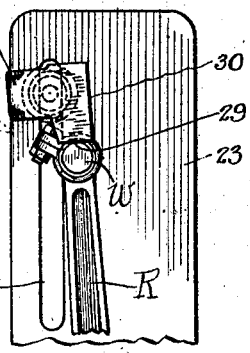
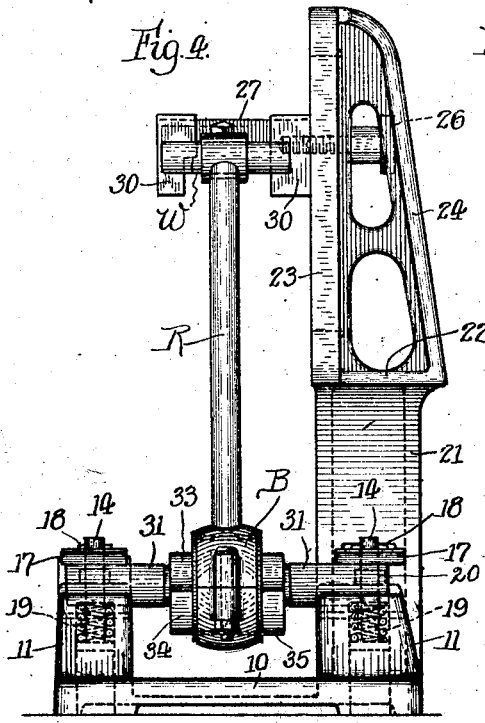
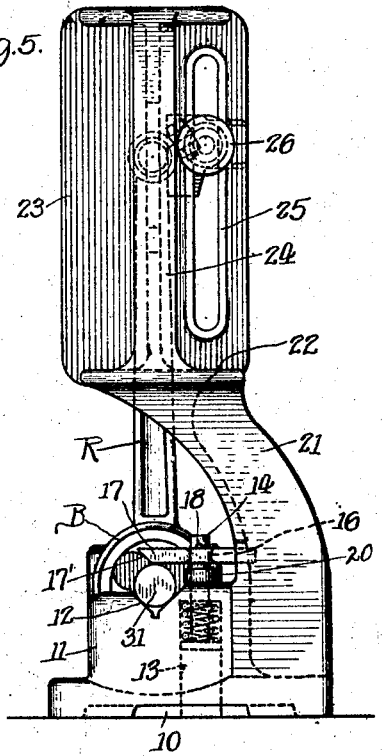
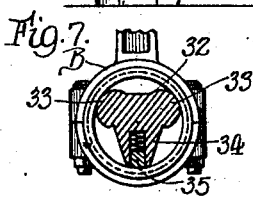
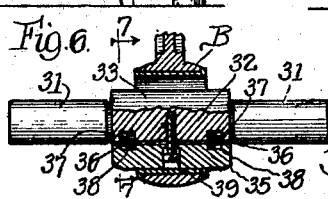
Inventor
Oskar Kylin
By Samuel N. Tond, Atty Patented Feb. 1, 1927.

1,616,053

UNITED STATES PATENT OFFICE.

OSKAR KYLIN, OF ELKHART, INDIANA, ASSIGNOR TO FOSTER-JOHNSON REAMER COMPANY, OF ELKHART, INDIANA, A CORPORATION OF INDIANA.

PRECISION TOOL OR FIXTURE.

Application filed December 15, 1924. Serial No. 755,893.

This invention relates to the general art of precision tools or fixtures for testing mechanical parts, more especially in respect of alinement, and the main object of the invention is to provide an improved and easily and quickly manipulated precision tool or fixture for use in machine shops, automobile service stations, and the like, to test the alinement and other relations of the connecting rod bearings, wrist pins, and pistons used in small motors, especially automobile motors, after said parts have been assembled preliminary to installation.

Other objects, ancillary to the above, are to provide, in connection with and as parts of such a precision tool or fixture, an improved three-point bearing expansible arbor to engage with different sizes of connecting rod bearings and test the accuracy of the boring of the latter as well as support the connecting rod in the fixture for the testing of the wrist pin and piston alinements, an improved holder for said arbor designed to afford a double support and lend a very high degree of accuracy, an improved wrist pin testing square and mounting and adjusting means therefor, and an improved piston surface alinement tester.

Other objects and attendant advantages of the invention will be apparent to persons skilled in the art to which it relates from the following detailed description, taken in connection with the accompanying drawings wherein I have illustrated a practical and approved embodiment of the invention, and in which—

Fig. 1 is a perspective elevation of the fixture showing the same adapted for testing the alinement of a connecting rod wrist pin;

Fig. 2 is a similar perspective elevation showing the same adapted for testing the surface alinement of a piston;

Fig. 3 is a front elevation, enlarged, of the upper part of Fig. 1, looking from the left of the latter figure, illustrating the testing of the wrist pin alinement in a vertical plane or its rectangular relation to the axis of the connecting rod;

Fig. 4 is a front elevation of the complete fixture, illustrating the testing of the wrist pin alinement in a horizontal plane, or its parallelism in a horizontal plane with the axis of the connecting rod bearing;

Fig. 5 is a side elevation, viewed from the right of Fig. 4;

Fig. 6 is a detail view, partly in elevation and partly in section, of the connecting rod bearing and the arbor engaged therewith; and Fig. 7 is a transverse section on the line 7—7 of Fig. 6.

Referring to the drawings, 10 designates a rectangular base or foundation plate, on and preferably integral with the ends of which are a pair of bearing blocks 11 formed in their upper surfaces with alined V-shaped notches 12 the sides of which are preferably inclined ninety degrees apart or at a right angle to each other. In rear of the notches 12 are holes 13, conveniently drilled from beneath, and forming housings and guides for pins 14 that extend upwardly through smaller coaxial holes 15 between the bottoms of the holes 13 and the top surfaces of the blocks. These pins 14 also extend up through holes 16 formed with transversely rounded edges (Fig. 5) in a pair of clamp plates 17, being held engaged with the latter by cotters 18. Compression springs 19 housed in the holes 13 and bearing downwardly on the heads of the pins 14 urge the clamp plates 17 downwardly, being limited by spacing collars 20 encircling the pins 14 between the clamp plates and the tops of the blocks. The forward edges of the clamp plates are preferably downwardly and rearwardly beveled, as shown at 17' for a purpose hereinafter disclosed.

Rising from the rear of one of the bearing blocks 11 is a forwardly curved standard 21 terminating in a horizontal top or shelf 22, from which latter rises a plate 23 and a central supporting brace or strut 24 for said plate. The front face of the plate 23 is machined to present an absolutely flat true vertical surface lying in a plane exactly at right angles to the vertical median plane of the two notches 12.

Adjustably mounted on and projecting forwardly of the front face of the plate 23 is a wrist pin square for testing the alinement of a connecting rod wrist pin in two planes at right angles to each other. Describing this feature, in the plate 23 is a vertical slot 25 in which is adjustably mounted and held by a clamp screw 26 the wrist of an arm 27 carrying a pair of spaced depending try-square blocks 28. These blocks have accurately alined flat bottom and side surfaces 29 and 30 respectively lying at right angles to each other. By loosening the clamp screw 26, the arm 27 can be raised and lowered and also turned on its own axis.

The testing fixture includes an expansible three-point bearing arbor for supporting a connecting rod in position to be tested. The structural details of this arbor are best shown in the detail views, Figs. 6 and 7, from which it will be seen that it comprises a straight bar formed with round coaxial end portions 31 adapted to seat in the notches 12 and be securely held therein by the spring-pressed clamp plates 17, and a generally triangular intermediate portion 32 adapted to engage with the crank pin bearing B of an automobile motor connecting rod R. This intermediate portion 32 is formed with a pair of oppositely disposed parallel outwardly swelled portions or cheeks 33 (Fig. 7) on the upper half thereof, and a depending V-shaped portion or lip 34. This lip 34 is longitudinally slotted to receive a bearing strip 35 that is normally pressed outwardly by a pair of compression springs 36 housed in registering pockets 37 and 38 in the arbor and slide respectively. The slide is limited as to its outward movement by a central countersunk screw 39 clearly shown in Fig. 6. From Fig. 7 it will be seeen that when the central portion 32 of the arbor is introduced into the bearing of the connecting rod, the expansion of the strip 35 causes the arbor to have a three-point bearing or support in the connecting rod bearing; two of these bearing points being on the outer surfaces of the cheeks 33 above the center, and the third being on the outer surface of the strip 35 directly below the center, these bearing points being approximately 120° apart. The described structural features of the central connecting rod engaging portion of the arbor not only enable the latter to be used with connecting rods having various sized bearings, but they also afford a secure support for the connecting rod bearing and, if the latter is true, hold the connecting rod itself in a vertical plane exactly at right angles to the axis of the arbor. The double support of the arbor at points on opposite sides of the connecting rod bearing also contributes to rigidity and accuracy, while the accurate boring of the connecting rod bearing B can also be tested by ascertaining whether or not the arbor has a line bearing on the connecting rod bearing at the three points throughout the full length of the connecting rod bearing.

Figures 1 to 5 of the drawings clearly illustrate the manner of use of the fixture in making the various alinement tests. Figs. 1 and 3 show the wrist pin square-applied to the top of the wrist pin W, thus testing the wrist pin alinement in one plane. Figs. 4 and 5 show the wrist pin square applied to the side of the wrist pin, thus testing the alinement of the latter in a plane at right angles to the test plane of Figs. 1 and 3. Fig. 2 shows a test of the surface alinement of the piston in the vertical plane of the wrist pin W. This is effected by so setting the arbor in its support that the piston P will lie against and tangent to the vertical face of the plate 23. Manifestly, if the piston or piston rings form a line contact with the face of the testing plate, the piston alinement is accurate. If it does not, this shows that the piston alinement is not true.

The arbor having first been mounted in the bearing B of the connecting rod, it is easily and quickly seated in the notches 12 of the supporting blocks 11 by simply grasping the connecting rod and pushing the round ends 31 of the arbor downwardly and forwardly between the forward ends of the clamp plates and the upper forward edges of the notches; and the arbor and connecting rod may be removed with equal facility by a simple outward pull on the connecting rod. In these operations the beveled ends 17' of the clamp plates manifestly facilitate the entrance and discharge of the arbor ends into and from the supporting notches.

From the foregoing it will be seen that my invention provides a precision tool or fixture for the character of the work described that is accurate, reliable, and may be very rapidly manipulated. This last quality is important because manifestly the profit of a service business of this character depends largely upon the time consumed in doing the work. While I have herein shown and described a specific embodiment of the principle of the invention well adapted to effectuate the stated purposes and objects thereof, it is manifest that the details of structure and arrangement may be considerably modified without involving any departure from the substance of the invention or sacrificing any of the advantages inherent therein. Hence, I reserve all such variations, modifications and mechanical equivalents as fall within the spirit and purview of the appended claims.

I claim—

1. In an alining fixture of the character described, the combination of a base plate, blocks on the ends of said base plate formed with horizontally alined V-shaped rectangular notches in their upper surfaces, a standard rising from said base plate, a plate on said standard formed with a flat vertical surface above said blocks lying in a plane at right angles to the vertical median plane of said notches, and a connecting rod supporting arbor having round ends adapted to rest in said notches and an intermediate portion shaped to provide three-point bearing in the crank-pin bearing of the connecting rod.

2. In an alining fixture of the character described, the combination of a base plate, blocks on the ends of said base plate formed with horizontally alined V-shaped notches in their upper surfaces, a standard rising from said base plate carrying a vertically slotted plate having a flat vertical face above said blocks lying in a plane at right angles to the vertical median plane of said notches, a connecting rod supporting arbor adapted to rest at its ends in said notches, and a try-square for the connecting rod wrist pin adjustably clamped in the slot of said plate and projecting from the flat vertical face thereof.

3. In an alining fixture of the character described, means for seating and holding a connecting rod supporting arbor comprising spaced blocks having horizontally alined V-shaped notches in their upper surfaces to seat the ends of said arbor, spring-pressed clamp plates overlying said notches and beveled on their forward free edges to facilitate the entrance and withdrawal of said arbor into and from said notches, and means for spacing said clamp plates above said notches.

OSKAR KYLIN.